United States Patent
Dowler et al.

(10) Patent No.: US 11,803,528 B2
(45) Date of Patent: Oct. 31, 2023

(54) METHOD AND APPARATUS FOR GENERATING DATA STRUCTURE DESCRIBING HOW TAXONOMIES EVOLVE AND USAGE ALGORITHM THEREOF

(71) Applicant: JPMorgan Chase Bank, N.A., New York, NY (US)

(72) Inventors: Nick Dowler, Dorset (GB); Andrew Key, Hampshire (GB); Yao Yao, Dorset (GB); Spyros Soukeras, London (GB); Cy Lloyd Jones, Dorset (GB); Daren Clarke, Hampshire (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/168,992

(22) Filed: Feb. 5, 2021

(65) Prior Publication Data

US 2022/0245106 A1    Aug. 4, 2022

(30) Foreign Application Priority Data

Feb. 2, 2021    (GR) .............................. 20210100070

(51) Int. Cl.
*G06F 16/21* (2019.01)
*G06F 16/28* (2019.01)
*G06F 16/248* (2019.01)
*G06F 16/2458* (2019.01)

(52) U.S. Cl.
CPC .......... *G06F 16/219* (2019.01); *G06F 16/248* (2019.01); *G06F 16/2474* (2019.01); *G06F 16/287* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 6,301,592 B1 * | 10/2001 | Aoyama | G06F 40/166 715/255 |
| 10,860,550 B1 * | 12/2020 | Chheda | G06F 16/2379 |
| 2013/0091138 A1 * | 4/2013 | Liensberger | G06F 40/169 707/E17.127 |
| 2013/0268561 A1 * | 10/2013 | Christie | G06F 16/28 707/777 |

(Continued)

*Primary Examiner* — Dawaune A Conyers
(74) *Attorney, Agent, or Firm* — Greenblum & Bernstein, P.L.C.

(57) ABSTRACT

Various methods, apparatuses/systems, and media for generating a data structure are provided. A database stores a historic version of taxonomy data and a new version of taxonomy data. A processor, operatively connected to the database, accesses the database and analyzes the historic version of taxonomy data and the new version of taxonomy data. The processor determines what changes have been made in connection with a particular reference data based on analyzing the historic version of taxonomy data and the new version of taxonomy data; creates, based on determining, an association between the historic version of taxonomy data and the new version of taxonomy data corresponding to said particular reference data; generates consistent metadata from said association; and generates a data structure that illustrates history of evolution of taxonomy in connection with said particular reference data based on the metadata.

18 Claims, 8 Drawing Sheets

(56) References Cited

U.S. PATENT DOCUMENTS

| | | | |
|---|---|---|---|
| 2017/0255885 A1* | 9/2017 | Whiteside | G06Q 10/06 |
| 2017/0371847 A1* | 12/2017 | Acorda | G06F 40/186 |
| 2020/0233542 A1* | 7/2020 | Breedvelt-Schouten | G06Q 10/063 |
| 2021/0097404 A1* | 4/2021 | Yanosy, Jr. | G06Q 40/12 |

* cited by examiner

```
class HierValues
    {
    boolean included; // whether the HierValues includes or excludes the members
    Set<HierMember> members;
    ...
    }
class HierMember
    {
    Value value; // typically the name of, or a reference to, a term from a taxonomy
    HierValues qualifiedBy; // either null, or the HierValues the value is further qualified by
    ...
    }
```

FIG. 5C

METHOD AND APPARATUS FOR
GENERATING DATA STRUCTURE
DESCRIBING HOW TAXONOMIES EVOLVE
AND USAGE ALGORITHM THEREOF

CROSS-REFERENCE TO RELATED
APPLICATIONS

This application claims the benefit of priority from Greek Patent Application No. 20210100070, filed Feb. 2, 2021, which is herein incorporated by reference in its entirety.

TECHNICAL FIELD

This disclosure generally relates to data processing, and, more particularly, to methods and apparatuses for generating a data structure describing how taxonomies evolve and applying algorithm to evergreen uses of terms from those taxonomies.

BACKGROUND

Today's enterprises, corporations, agencies, institutions, and other organizations are facing a continuing problem of handling and processing a vast amount of data that undergoes changes overtime in a quick and expedited manner. The vast amount of data often received on a daily basis may be now stored electronically and may need to be analyzed by a variety of persons within the organization relative to business or organizational goals. For example, taxonomies associated with the data can change over time. Typically, other data structures may utilize the terms in taxonomies to classify and describe coverage of the dimensions that taxonomies describe. For example, a taxonomy of Geography might have terms reflecting continents, countries, counties, cities, etc., and a Trading data structure might select terms from there to describe where trading occurs.

A statement that trading occurs in "Europe", implies trading in its children, i.e., "UK", "France", "Germany", etc. As taxonomies evolve, any data that references them may need to be amended in order to state the same thing in the new taxonomy version that was originally stated in the old taxonomy version. However, this may not be always a straightforward task to do reliably, and at scale, and may prove to be highly error prone and time consuming.

SUMMARY

The present disclosure, through one or more of its various aspects, embodiments, and/or specific features or sub-components, may provide, among others, various systems, servers, devices, methods, media, programs, and platforms for generating a data structure describing how taxonomies evolve and applying algorithm to evergreen uses of terms from those taxonomies, thereby allowing downstream consumers to understand and interpret the more complex scenario about what actually happened to the taxonomies during evolution, but the disclosure is not limited thereto.

According to an aspect of the present disclosure, a method for generating a dam structure by utilizing one or more processors and one or more memories is disclosed. The method inn include: accessing a database that stores a historic version of taxonomy data and a new version of taxonomy data; analyzing the historic version of taxonomy data and the new version of taxonomy data; determining what changes have been made in connection with a particular reference data based on analyzing the historic version of taxonomy data and the new version of taxonomy data; creating, based on determining, an association between the historic version of taxonomy data and the new version of taxonomy data corresponding to said particular reference data; generating consistent metadata from said association; and generating a data structure that illustrates history of evolution of taxonomy in connection with said particular reference data based on the metadata, thereby allowing downstream consumers by utilizing client devices) to understand and interpret the more complex scenario about what actually happened to the taxonomies during evolution, but the disclosure is not limited thereto.

According to another aspect of the present disclosure, the method may further include: designating corresponding reference identifier (ID) for each term in the historic version of taxonomy data and the new version of taxonomy data; and comparing the reference ID for each term in the historic version of taxonomy data and the new version of taxonomy data to determine what changes have been made in connection with the particular reference data.

According to yet another aspect of the present disclosure, wherein the me data may be a term evolution data construct that describes one or more of the following or a combination thereof: an unchanged term, a term superseded by another term, a term superseded by multiple terms, multiple terms superseded by a term, a term that is superseded by nothing, and term that supersedes nothing.

According to further aspect of the present disclosure, wherein supersede relations are relationships between terms in the historic version of taxonomy data and the new version of taxonomy data of the same taxonomy.

According to yet another aspect of the present disclosure, the method may further include: determining that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

According to an additional aspect of the present disclosure, wherein the data structure may be an N-dimensional hypercube or a one dimensional data structure, but the disclosure is not limited thereto.

According to another aspect of the present disclosure, a system for generating a data structure is disclosed. The system may include a database that stores a historic version of taxonomy data and a new version of taxonomy data; and a processor coupled to the database via a communication network. The processor may be configured to: analyze the historic version of taxonomy data and the new version of taxonomy data by accessing the database; determine what changes have been made in connection with a particular reference data based on analyzing the historic, version of taxonomy data and the new version of taxonomy data; create, based on determining, an association between the historic version of taxonomy data and the new version of taxonomy data corresponding to said particular reference data; generate consistent metadata from said association; and generate a data structure that illustrates history of evolution of taxonomy in connection with said particular reference data based on the metadata, thereby allowing downstream consumers (i.e., by utilizing client devices) to understand and interpret the more complex scenario about what actually happened to the taxonomies during evolution, but the disclosure is not limited thereto.

According to yet another aspect of the present disclosure, the processor may be further configured to: designate corresponding reference identifier (ID) for each term in the historic version of taxonomy data and the new version of taxonomy data; and compare the reference ID for each term in the historic version of taxonomy data and the new version of taxonomy data to determine what changes have been made in connection with the particular reference data.

According to another aspect of the present disclosure, the processor may be further configured to: determine that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

According to an additional aspect of the present disclosure, a non-transitory computer readable medium configured to store instructions for generating a data structure is disclosed. The instructions, when executed, tray cause a processor to perform the following: accessing a database that stores a historic version of taxonomy data and a new version of taxonomy data; analyzing the historic version of taxonomy data and the new version of taxonomy data; determining what changes have been made in connection with a particular reference data based on analyzing the historic version of taxonomy data and the new version of taxonomy data; creating, based on determining, an association between the historic version of taxonomy data and the new version of taxonomy data corresponding to said particular reference data; generating consistent metadata from said association; and generating a data structure that illustrates history of evolution of taxonomy in connection with said particular reference data based on the metadata, thereby allowing downstream consumers (i.e., by utilizing client devices) to understand and interpret the more complex scenario about what actually happened to the taxonomies during evolution, but the disclosure is not limited thereto.

According to another aspect of the present disclosure, wherein the instructions, when executed, may further cause the processor to perform the following: designating corresponding reference identifier (ID) for each term in the historic version of taxonomy data and the new version of taxonomy data; and comparing the reference ID for each term in the historic version of taxonomy data and the new version of taxonomy data to determine what changes have been made in connection with the particular reference data.

According to yet another aspect of the present disclosure, wherein the instructions, when executed, may further cause the processor to perform the following: determining that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5B illustrates an exemplary term evolution data construct in accordance with another exemplary use case.

FIG. 5C illustrates an exemplary snippet of a pseudo code in accordance with an exemplary use case.

DETAILED DESCRIPTION

Figure 1:
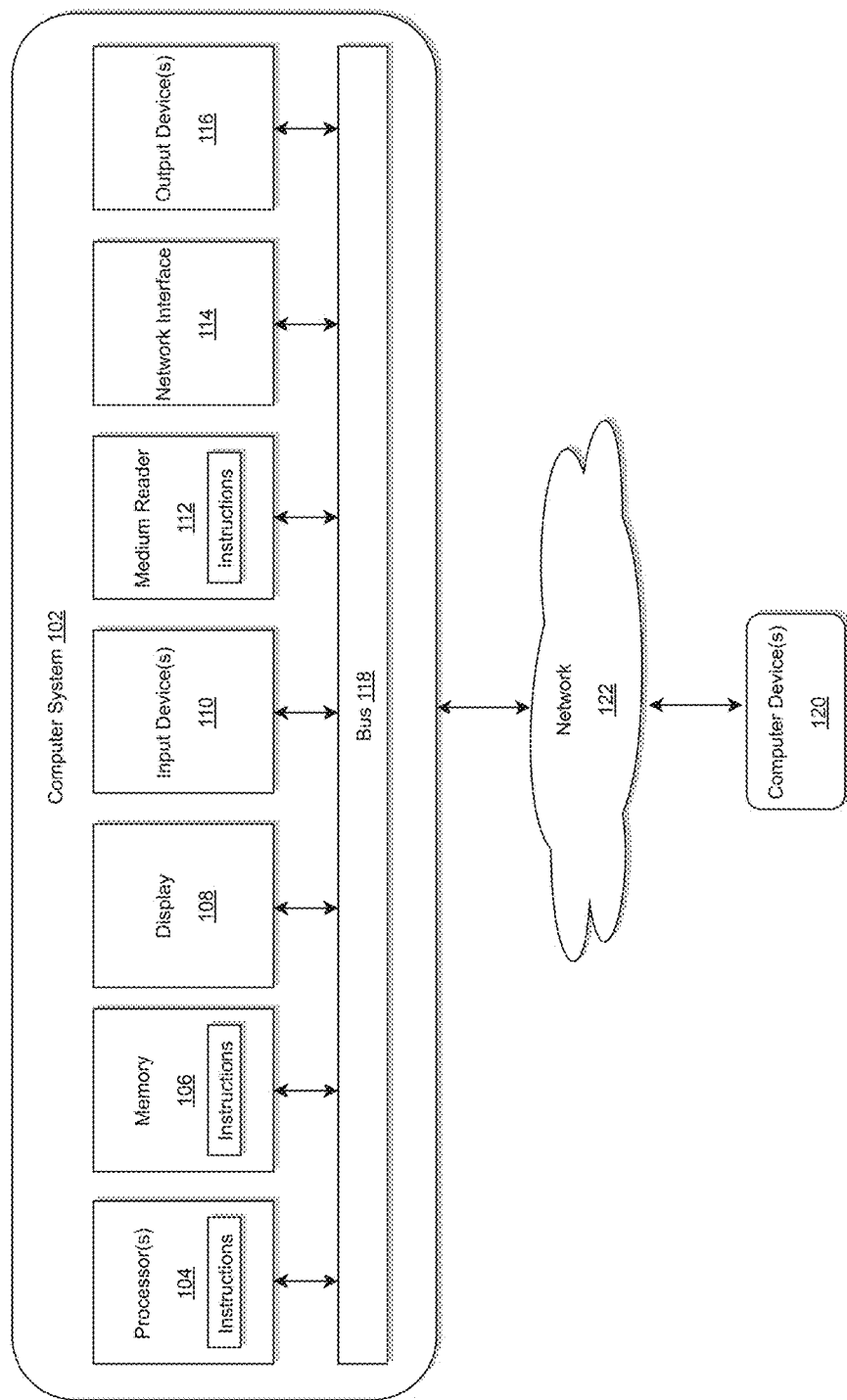
FIG. 1 illustrates a computer system for automatically generating data structure describing how taxonomies evolve and applying algorithm to evergreen uses of terms from those taxonomies in accordance with an exemplary embodiment.

Through one or more of its various aspects, embodiments and/or specific features sub-components of the present disclosure, are intended to bring out one or more the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in automatically generating a data structure describing how taxonomies evolve and applying algorithm to evergreen uses of terms from those taxonomies in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 run operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily an place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or on-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at east one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions nay reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 shown is in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support virtual processing environment.

As described herein, various embodiments provide optimized processes of generating a data structure describing how taxonomies evolve and applying algorithm to evergreen uses of terms from those taxonomies, thereby allowing downstream consumers to understand and interpret the more complex scenario about what actually happened to the taxonomies during evolution, but the disclosure is not limited thereto.

Figure 2:
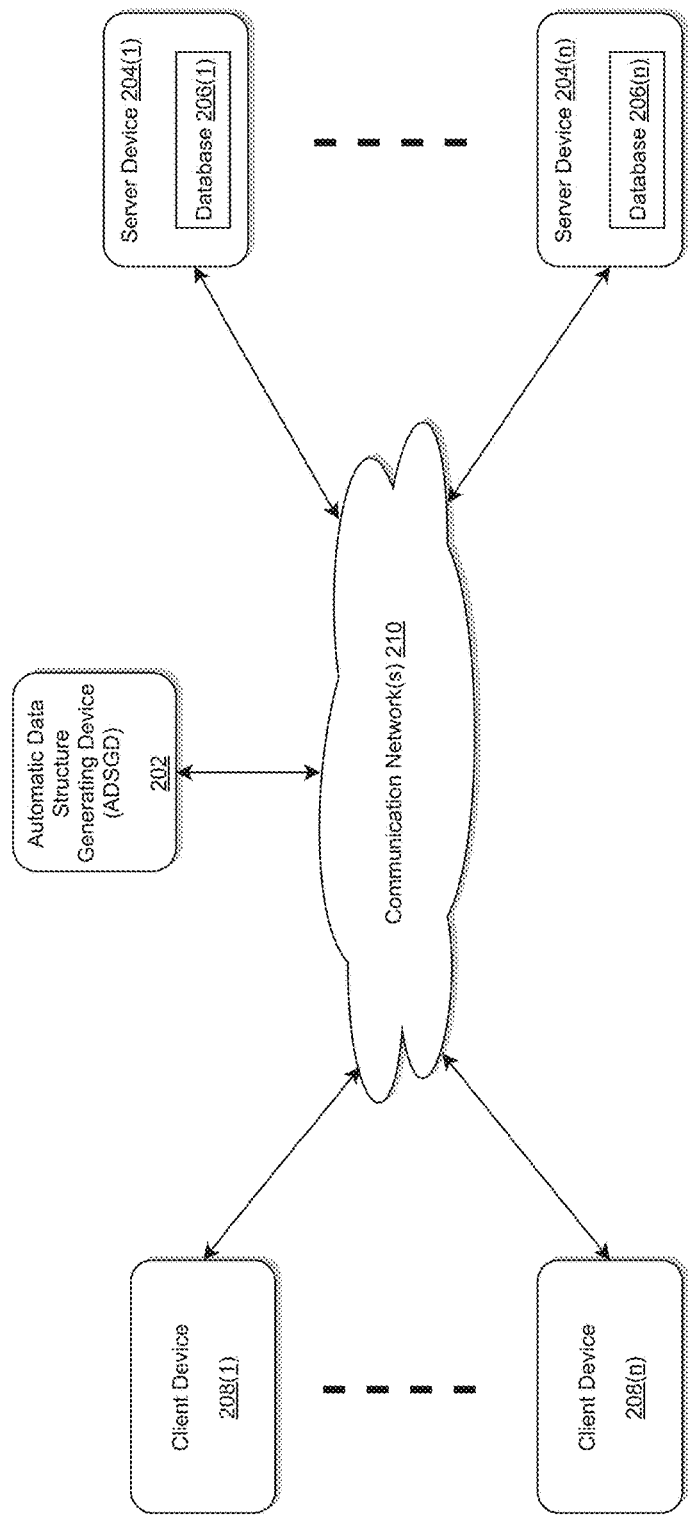
FIG. 2 illustrates an exemplary diagram of a network environment with an automatic data structure generating device in accordance with an exemplary embodiment.

Referring to FIG. 2, a schematic of an exemplary network environment 200 for implementing an automatic data structure generating device (ADSGD) of the instant disclosure is illustrated.

According to exemplary embodiments, the above-described problems associated with conventional system may be overcome by implementing an ADSGD 202 as illustrated in FIG. 2 for automatically generating a data structure describing how taxonomies evolve and applying algorithm to evergreen uses of terms from those taxonomies, thereby allowing downstream consumers (i.e., by utilizing client devices) to understand and interpret the more complex scenario about what actually happened to the taxonomies during evolution, but the disclosure is not limited thereto.

The ADSGD 202 may be the same or similar to the computer system 102 as described with respect to FIG. 1.

The ADSGD 202 may store one or more applications that can include executable instructions that, when executed by the ADSGD 202, cause the ADSGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the applications) may be operative in a cloud-based computing environment. The applications) may be executed within or as virtual machine(s) or virtual server(s) that may be managed in a cloud-based computing environment. Also, the application(s), and even the ADSGD 202 itself, may be located in virtual server(s) running in a cloud-based computing environment rather than being tied to one or more specific physical network computing devices. Also, the application(s) may be running in one or more virtual machines (VMs) executing on the ADSGD 202. Additionally, in one or more embodiments of this technology, virtual machine(s) running on the ADSGD 202 may be managed or supervised by a hypervisor.

In the network environment 200 of FIG. 2, the ADSGD 202 is coupled to a plurality of server devices 204(1)-204(n) that hosts a plurality of databases 206(1)-206(n), and also to a plurality of client devices 208(1)-208(n) via communication network(s) 210. A communication interface of the ADSGD 202, such as the network interface 114 of the computer system 102 of FIG. 1, operatively couples and communicates between the ADSGD 202, the server devices 204(1)-204(n), and/or the client devices 208(1)-208(n), which are all coupled together by the communication network(s) 210 although other types and/or numbers of communication networks or systems with other types and/or numbers of connections and/or configurations to other devices and/or elements may also be used.

The communication networks) 210 may be the same or similar to the network 122 as described with respect to FIG. 1, although the ADSGD 202, the server devices 204(1)-

204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 tray include local area network(s) (LAN(s)) or wide area network(s) (WAN(s)), and coat use TCP/IP over Ethernet and industry-standard protocols, although other types and/or numbers of protocols and/or communication networks may be used. The communication network(s) 202 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The ADSGD 202 may be a standalone device or integrated with one or more other devices or apparatuses, such as one or more of the server devices 204(1)-204(n), for example. In one particular example, the ADSGD 202 may be hosted by one of the server devices 204(1)-204(n), and other arrangements are also possible. Moreover, one or more of the devices of the ADSGD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory; and a communication interface, which are coupled together by a bus or other communication link, although other numbers and/or types of network devices may be used. The server devices 204(1)-204(n) in this example may process requests received from the ADSGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a pee to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination f features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ADSGD 202 that may be configured for automatically generating a data structure describing how taxonomies evolve and applying algorithm to evergreen uses of terms from those taxonomies, thereby allowing downstream consumers to understand and interpret the more complex scenario about what actually happened to the taxonomies during evolution, but the disclosure is not limited thereto.

Accordingly, the client devices 208(1)-208(n) may be mobile computing devices, desktop computing devices, laptop computing devices, table computing devices, virtual machines (including cloud-based computers), or the like, that host at, e-mail, or voice-to-text applications, for example.

The client devices 208(1)-208(n) may run interface applications, such as standard web browsers or standalone client applications, which may provide an interface to communicate with the ADSGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ADSGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADSGD 202, the server devices 204(1)-204(n), or the client devices 208(1)-208(n), for example, may be configured to operate as virtual instances on the same physical machine. For example, one or more of the ADSGD 202, the server devices 204(1)-204 (n), or the client devices 208(1)-208(n) may operate on the same physical device rather than as separate devices communicating through communication network(s) 210. Additionally, there may be more or fewer ADSGDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
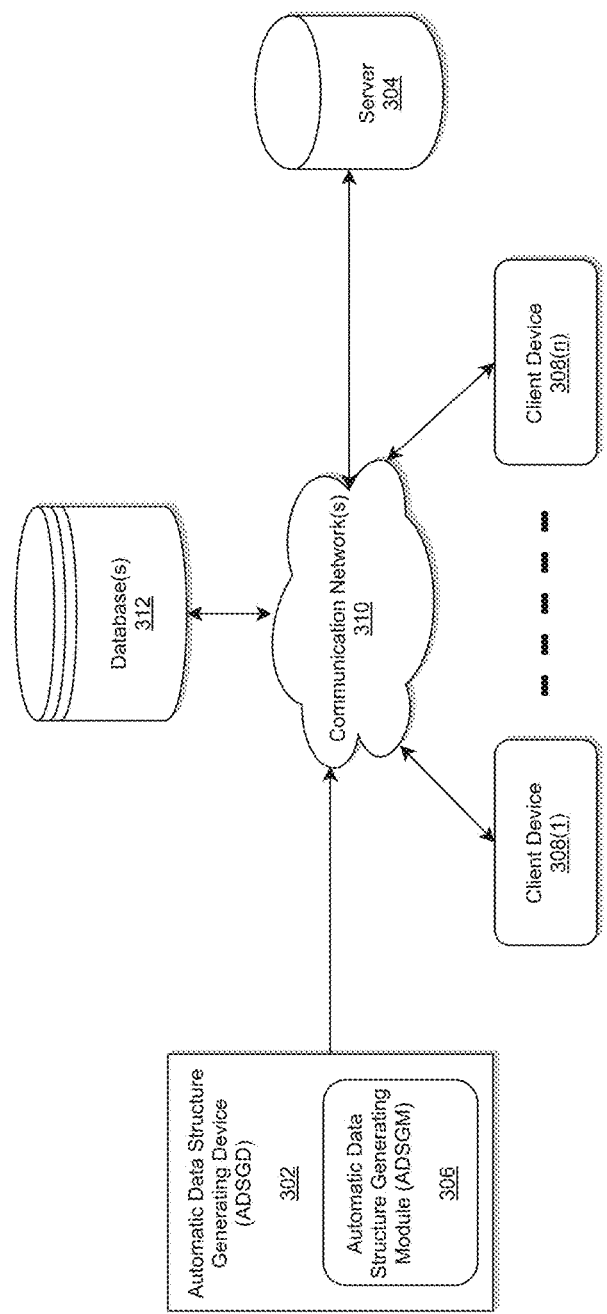
FIG. 3 illustrates a system diagram for implementing an automatic data structure generating device with an automatic data structure generating module in accordance with an exemplary embodiment.

FIG. 3 illustrates a system diagram for implementing an ADSGD with an automatic data structure generating module (ADSGM) in accordance with an exemplary embodiment.

As illustrated in FIG. 3, in the system 300, according to exemplary embodiments, the ADSGD 302 including the ADSGM 306 may be connected to a server 304 and a database 312 via a communication network 310, but the disclosure is not limited thereto. For example, according to exemplary embodiments, the ADSGM 306 may be connected to any desired database besides database 312. According to exemplary embodiments, the database 312 may be configured to store outputs (e.g., data) from any desired number of applications or systems, but the disclosure is not limited thereto.

According to exemplary embodiment, the ADSGD 302 is described and shown in FIG. 3 as including the ADSGM 306, although it may include other rules, policies, modules, databases, or applications, for example. According to exemplary use case, the database 312 may be configured to store a plurality of data each associated with a corresponding application and each including metadata describing information about data present in an application, but the disclosure is not limited thereto. According to exemplary embodiments, the database 312 may be embedded within the ADSGD 302. According to exemplary embodiments, the server 304 may also be a database which may be configured to store information including the metadata, but the disclosure is not limited thereto.

According to exemplary embodiments, the ADSGM 306 may be implemented via user interfaces, e.g., web user interface, but the disclosure is not limited thereto, and may be integrated with a private cloud platform via the ADSGM 306 and an authentication service, but the disclosure is not limited thereto.

According to exemplary embodiments, the ADSGM 306 may be configured to receive continuous feed of data from the server 304 and the database 312 via the communication network 310.

As will be described below, the ADSGM 306 may be configured to analyze the historic version of taxonomy data and the new version of taxonomy data by accessing the database; determine what changes have been made in connection with a particular reference data based on analyzing the historic version of taxonomy data and the new version of taxonomy data; create, based on determining, an association between the historic version of taxonomy data and the new version of taxonomy data corresponding to said particular reference data; generate consistent metadata from said association; and generate a data structure that illustrates history of evolution of taxonomy in connection with said particular reference data based on the metadata, thereby allowing downstream consumers (by utilizing client devices) to understand and interpret the more complex scenario about what actually happened to the taxonomies during evolution, but the disclosure is not limited thereto. According to exemplary embodiments, the data structure may be generated automatically, manually; or a combination thereof.

According to exemplary embodiments, the server 304 may be the same or equivalent to the server device 204 as illustrated in FIG. 2.

The process may be executed via the communication network 310, which may comprise plural networks as described above. For example, in an exemplary embodiment, either or all of client devices 308(1)-308(n) may communicate with the ADSGD 302 via broadband or cellular communication. Of course, these embodiments are merely exemplary and are not limiting or exhaustive.

Figure 4:
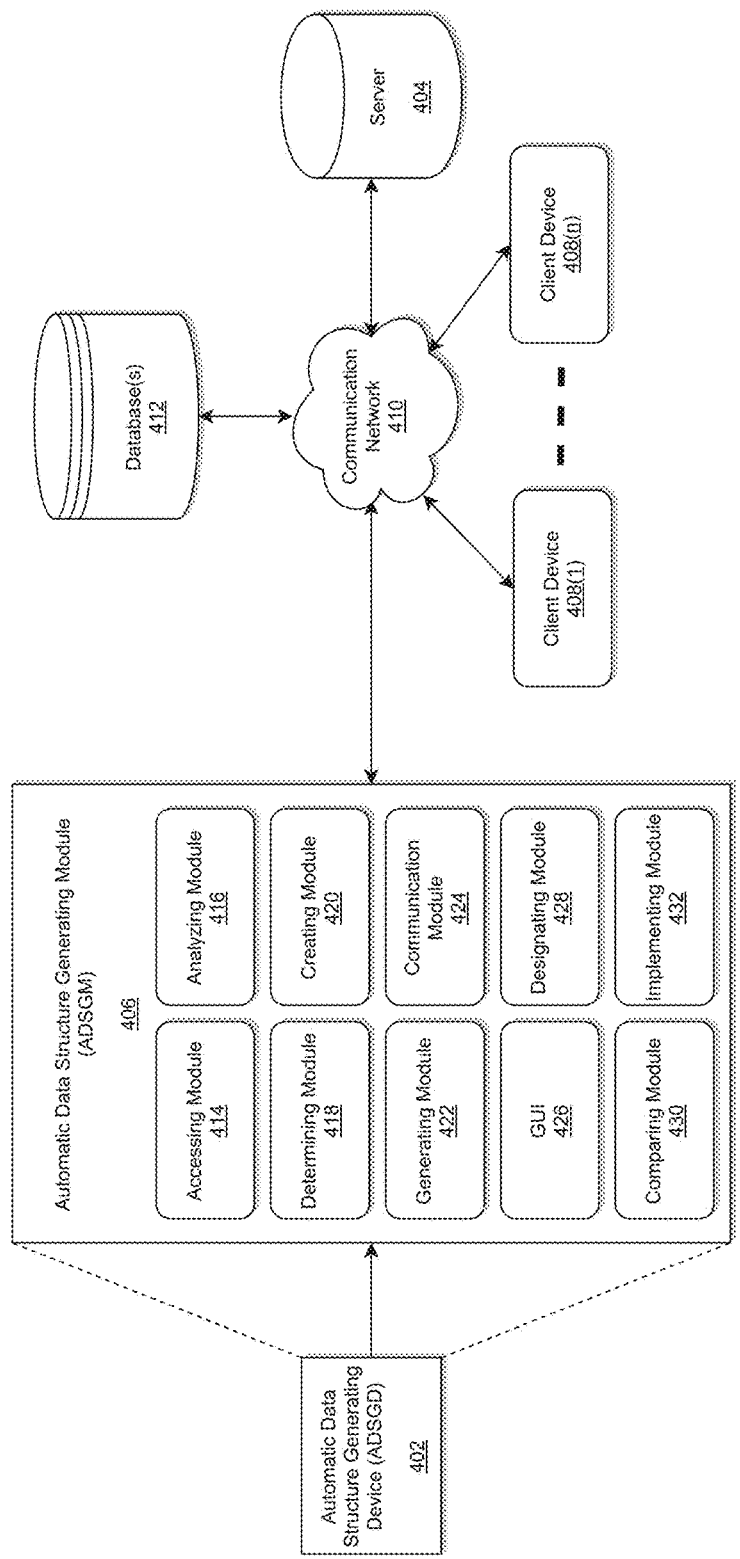
FIG. 4 illustrates a system diagram for implementing automatic data structure generating module of FIG. 3 in accordance with an exemplary embodiment.

FIG. 4 illustrates a system diagram for implementing automatic data structure generating module of FIG. 3 in accordance with an exemplary embodiment. As illustrated in FIG. 4, the system 400 may include an ADSGD 402 within which an ADSGM 406 may be embedded, a database 412, a server 404, a plurality of client devices 408(1)-408(n), and a communication network 410.

According to exemplary embodiments, the ADSGD 402, ADSGM 406, database 412, the server 404, the client devices 408(1)-408(n), and the communication network 410 as illustrated in FIG. 4 may be the same or similar to the ADSGD 302, the ADSGM 306, the database 312, the server 304, the client devices 308(1)-308(n), and the communication network 310, respectively, as illustrated in FIG. 3.

As illustrated in FIG. 4, the ADSGM 406 may include an accessing module 414, an analyzing module 416, a determining module 418, a creating module 420, a generating module 422, a communication module 424, a GUI 426, a designating module 428, a comparing module 430, and an implementing module 432. According to exemplary embodiments, the database 412 may be external to the ADSGD 402 and the ADSGD 402 may include various systems that are managed and operated by an organization.

The process may be executed via the communication module 424 and the communication network 410, which may comprise plural networks as described above. For example, in an exemplary embodiment, the various components of the ADSGM 406 may communicate with the server 404, and the database 412 via the communication module 424 and the communication network 410. Of course, these embodiments are merely exemplary and are not limiting or exhaustive.

According to exemplary embodiments, the communication module 424 may be configured to establish a link between the database 412 via the communication network 410.

According to exemplary embodiments, each of the accessing module 414, analyzing module 416, determining module 418, creating module 420, generating module 422, communication module 424, designating module 428, comparing module 430, and the implementing module 432 may be implemented by microprocessors or similar, they may be programmed using software (e.g., microcode) to perform various functions discussed herein. Alternatively, each of the accessing module 414, analyzing module 416, determining module 418, creating module 420, generating module 422, communication module 424, designating module 428, comparing module 430, and the implementing module 432 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the accessing module 414, analyzing module 416, determining module 418, creating module 420, generating module 422, communication module 424, designating module 428, comparing module 430, and the implementing module 432 may be physically separated into two or more interacting and discrete blocks, units, devices, and/or modules without departing from the scope of the inventive concepts.

According to exemplary embodiments, each of the accessing module 414, analyzing module 416, determining module 418, creating module 420, generating module 422, communication module 424, designating module 428, comparing module 430, and the implementing module 432 of the ADSGM 406 may be called by corresponding API, but the disclosure is not limited thereto.

According to exemplary embodiments, the taxonomy creation module 408 may be configured to create taxonomies describing data concepts associated with the metadata and store the taxonomies onto the database 412. The capturing module 414 may be configured to capture and receive the metadata and the taxonomies from the database 412 via the communication network 410 and the communication module 424.

Figure 5A:
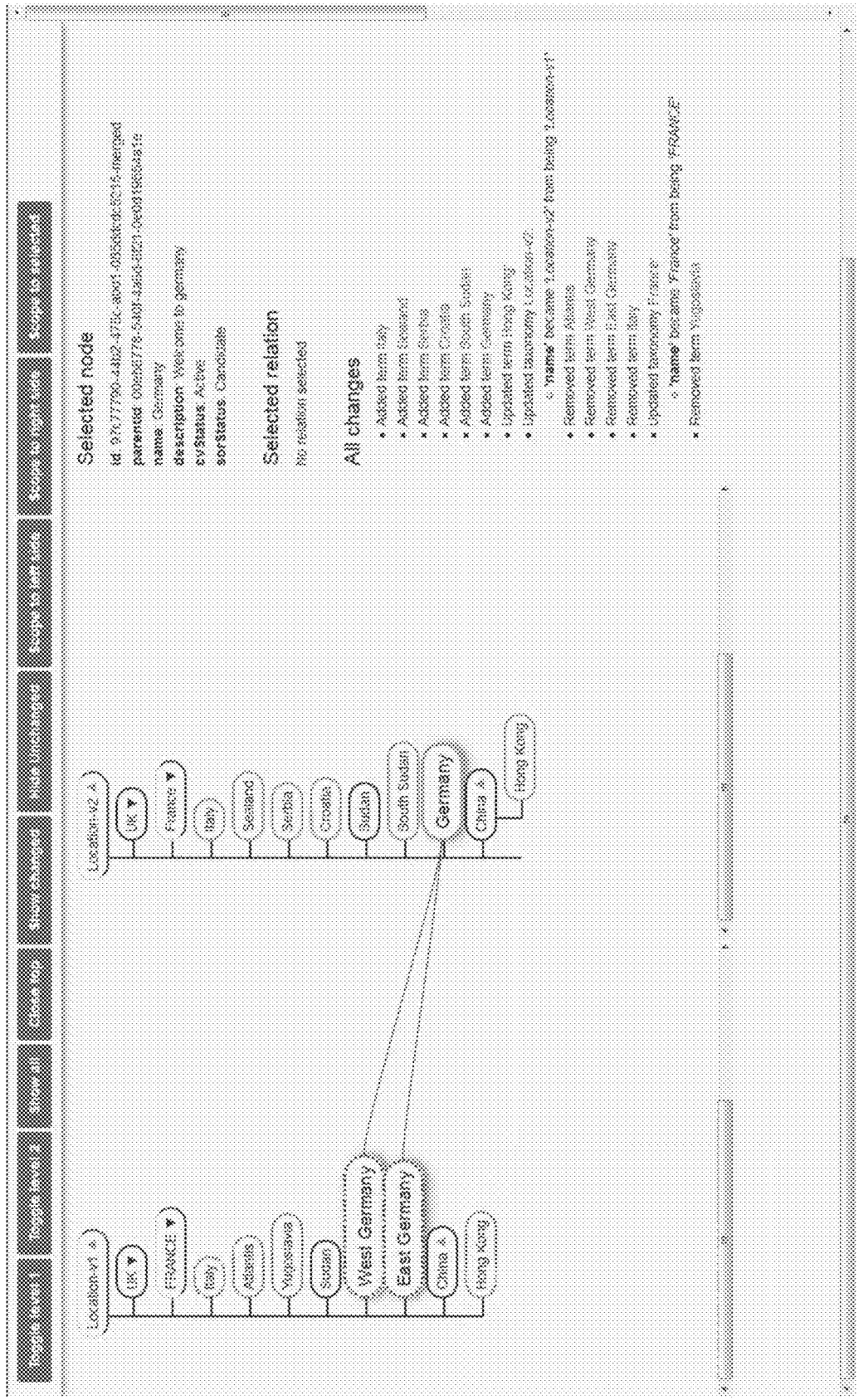
FIG. 5A illustrates an exemplary term evolution data construct in accordance with an exemplary use case.
Figure 5B:
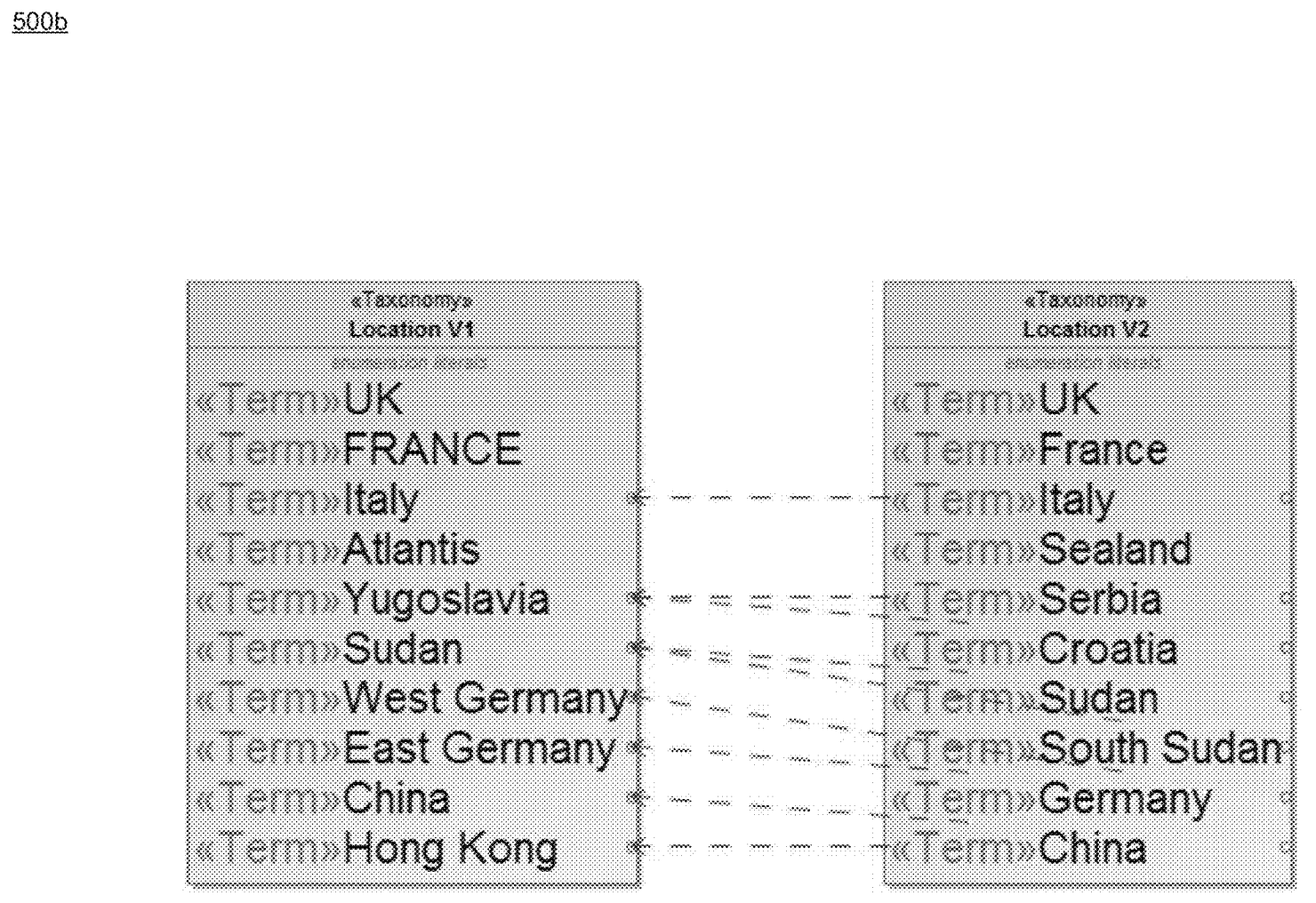

FIG. 5A illustrates an exemplary term evolution data construct 500a in accordance with an exemplary use case. FIG. 5B illustrates an exemplary evolution data construct 500b in accordance with another exemplary use case. According to exemplary embodiments, hierarchical values may be a hierarchical selection of included or excluded terms from a taxonomy, where each term can be further qualified by a hierarchical values. The term evolution data may be automatically generated, manually, or a combination thereof. Utilizing this term evolution data, selections from taxonomies, expressed as sets of included or excluded terms (each potentially further qualified the same way) may be automatically re-expressed using new taxonomy versions, wherever this is possible.

Referring to FIGS. 4, 5A, and 5B, according to exemplary embodiments, the ADSGM 406 may be configured to implement re-expression, hypercube library, and a taxonomy incrementer, which is a proof-of-concept piece of code that implements a re-expression algorithm disclosed herein, using the hierarchical values and hierarchical member classes in the hypercube library.

Re-Expression

According to exemplary embodiments, the ADSGM 406 may implement re-expression of all the terms in all the term sets in all the scope qualifying expressions in all the data boundary sets for a given data fact, so as to only to use terms from a prescribed set of vocabulary versions.

According to exemplary embodiments, the re-expression may need source vocabulary versions, target vocabulary versions, term evolution data mapping between source and target terms, and source fact, but the disclosure is not limited thereto. For example, if one knows that: in the source location taxonomy, there was West Germany and East Germany in the target location taxonomy, there is now Germany (see, e.g., FIG. 5); the term evolution data states that West Germany and East Germany merged to form Germany; and the source fact states that booking location={West Germany, East Germany, France}, then one can convert this to fact which states booking location={Germany, France}. If instead, the source fact states booking location={West Germany, France}, then one could not automatically re-express this fact.

According to exemplary embodiments, the term evolution data is specified as a set of "supersedes" mappings. These state that source Term(s) are superseded by target Term(s). Such mappings can therefore the 1:1, 1:N or M:1 (or even M:N). Where a source Term exists along with a target Term with the same identifier, then a 1:1 supersede mapping is inferred. Any remaining source Terms are deletes, and any remaining target Terms are creates. One could envisage these as 1:0 and 0:1 mappings. The unusual thing about supersede mappings may be that they are mappings between Terms in different versions of the same Vocabulary.

According to exemplary embodiments, the term evolution data construct (i.e., data structure) generated by the ADSGM 406, is therefore able to describe one or more of the following or a combination thereof: an unchanged Term; Term superseded by Term—is replace; Term superseded by multiple Terms—a split; multiple Terms superseded by a Term—a merge; more complex merge/split scenarios; Term that is superseded by nothing—a delete; Term that supersedes nothing—a create, etc., but the disclosure is not limited thereto.

A non-limiting exemplary use case is described wherein with reference to FIGS. 5A and 5B. The exemplary term evolution data constructs 500a and 500b illustrated in FIGS. 5A and 5B, respectively are in model form of the term evolution data construct generated by the ADSGM 406.

Except where stated, all terms retain the same identifier (ID) and name. "Supersede" relationships are special relationships between terms in two versions of the same Taxonomy. There is an "implicit" supersede relationship between term T1 in location version one (V1) and term T2 in location version two (V2), if TI and T2 have the same ID, and there are no supersedes relationships explicitly documented from T2 to anything in V1 or from anything in V2 to T1.

According to "Rename and Edit" property implemented by the ADSGM 406, as illustrated in FIGS. 5A and 5B, "FRANCE" changes its name to "France." Thus, no supersede relationship is needed, as ID is unchanged. Similarly, if other properties (e.g., state) of term are changed, no supersede relationship is required, as ID is unchanged.

According to "Replace" property implemented by the ADSGM 406, as illustrated in FIGS. 5A and 5B, Italy (with old ID) is replaced by a new Italy (with a new ID). Thus, supersede relationship is required to document the replace.

According to "Physical Delete" property implemented by the ADSGM 406, as illustrated in FIGS. 5A and 5B, for the term Atlantis, nothing supersedes it.

According to "Create" property implemented by the ADSGM 406, as illustrated in FIGS. 5A and 5B, Seal and is created as a new term. Thus, it supersedes nothing.

According to "Split (Equal)" property implemented by the ADSGM 406, as illustrated in FIGS. 5A and 5B, Yugoslavia splits into Serbia and Croatia, which have different IDs. Thus, supersedes relationships are required to document the split.

According to "Split (Dominant)" property implemented by the ADSGM 406, as illustrated in FIGS. 5A and 5B, South Sudan is crated (with a new ID) by taking a portion out of Sudan (ID unchanged). Thus, supersedes relationships are required to document the split.

According to "Merge (Equal)" property implemented by the ADSGM 406, as illustrated in FIGS. 5A and 5B, West Germany and East Germany become Germany (with a new ID). Thus, supersedes relationships are required to document the merge.

According to "Merge (Dominant)" property implemented by the ADSGM 406, as illustrated in FIGS. 5A and 5B, Hong Kong is merged into China. Thus, supersedes relationships are required to document the merge.

Some sources of reference data may not be able to provide Term Evolution Data. In such a scenario, all one can do is infer 1:1 supersede relationships s here Term identifiers match. After this is done, there will be unmapped source Terms and/or unmapped target Terms. If there is EITHER unmapped source OR unmapped target Terms, then one can infer deletes or creates. But, if there are BOTH (unmapped source and unmapped target Terms), one cannot infer anything: an unmapped source Term could be a delete, or it could be replaced by an unmapped target Term.

Therefore, when mapping a particular hierarchical value, expressed in the source Vocabulary, if it uses any terms that are unmapped, then one cannot map the value to the target Vocabulary, and must fail with a "term could be deleted or replaced" error.

According to exemplary embodiments, the re-expression algorithm implemented by the ADSGM 406 considers whether each (non-created) Term in the target Vocabulary can be present in the result, by looking to see whether the Terms that it maps from are present in the source value. For target Terms that supersede multiple source Terms, there is the possibility that only some of them are present in the source value. In such a case one must fail with a "partial merge" error.

According to exemplary embodiments, the ADSGM 406 may be configured to implement processes for evergreening selections of terms from taxonomies, as the taxonomies evolve, whether or not the use of taxonomies is single or multi-dimensional. The ability to perform intersection, union and difference of hierarchical values (producing hierarchical values) is integral to the algorithm required. In addition, according to exemplary embodiments, the ADSGM 406 may be configured to re-express hierarchical values to form a new hierarchical values, regardless of whether the hierarchical values is on its own, or whether there are a number of constrained dimensions, each with a hierarchical values.

For example, according to exemplary embodiments, the algorithm doesn't actually look for Terms in the source value. Each source Term corresponds to a hierarchical value representing itself, and none of its children. A target Term supersedes a set of source Terms and it is considered "substantiated" if the logical union of the hierarchical values is present in the source value. Substantiation can be, for example, none so the target Term isn't a part of the result; full—so the target Term is a part of the result; partial this is a "partial merge" error, but the disclosure is not limited thereto.

Implementing the algorithm in this way copes with negatives, and negatives can be present the result. It also copes with arbitrary Taxonomy restructuring, where re-expression is actually possible. Taxonomy restructuring may likely result in many non-re-expressible facts.

One might think that the algorithm should fail if it encounters an unmapped target Term. To address this issue, the ADSGM 406 may be configured to check, prior to implementing the algorithm, that there are no unmapped source Terms in the source value. Therefore, it is confirmed that there are no loose source Terms that could possibly be mapped to the unmapped target, and therefore, one can treat it like a normal create.

The hierarchical values and hierarchical member classes in the hypercube library directly supports implementing this algorithm by the taxonomy incrementer.

It may be expected that depending on the source data and the nature of the change between taxonomy versions, there will be small proportion of "partial merge" errors. If term evolution data is not available, there will likely be a larger proportion of "deleted or replaced" errors. Consider a scenario in which Taxonomy T1 has Terms {A, B}, T2 has {A}, and T3 has {A, C}. Attempting to re-express from T1 to T3 is problematic, as one can't tell if B is deleted and C is created, or if B is replaced by C. However, re-expressing from T1 to T2 and then from T2 to T3 is not problematic, as one now know that B is deleted and that C is created. The upshot is that when trying to re-express from Tm to Tn, one can use full Term Evolution Data to take large strides forward, but is not available, one has to take the smallest possible steps.

Re-expression may be computationally expensive. Thus, the results of re-expression implemented by the ADSGM 406 should be cached and stored.

Hypercube Library

According to exemplary embodiments, the hypercube library generated by the ADSGM 406 may be a mathematical construct. For example, the hypercube library can represent and calculate on single hierarchical values, and also N-dimensional hypercubes in which constrained dimensions are represented by hierarchical values. Another example use of the hypercube library may be establishing a set of specification-by-example use cases covering all possible combinations of inputs.

According to exemplary embodiments, the hypercube library may implement the following concepts, but the disclosure is not limited thereto: Abstract Value class—one is expected to provide own specialization of this; a handy String based Value class; Values, for example, statements of what Values are acceptable/unacceptable (HierValues, i.e., a set of hierarchically qualified Values, ideal for handling Terms from Taxonomies).

For example, FIG. 5C illustrates an exemplary snippet 500c of a pseudo code in accordance with an exemplary use case described herein. Thus, in view of the pseudo code illustrated in FIG. 5C, a system could record the fact that one is trading with a Booking Location=NORTH AMERICA/ UNITED STATES, and that in this statement Booking Location is a dimension that is being described herein; NORTH AMERICA and UNITED STATES are terms from a location taxonomy; NORTH AMERICA/UNITED STATES is a HierValues including a HierMember for term NORTH AMERICA, which in turn is qualified by a nested HierValues including a HierMember for term UNITED STATES, which is not further qualified.

In the notation described herein, single values do not need {brackets}, but multiple values do. If value(s) are acceptable, then + can optionally precede the value(s), if unacceptable, then -. The/notation means "qualified by". Thus, to cover all of EUROPE excluding UK and FRANCE, and also all of ASIA, and also just the CANADA part of NORTH AMERICA, it might be stated as follows:

{EUROPE/-{UK,FRANCE},ASIA,NORTH AMERICA/CANADA}.

Taxonomy Incrementer

According to exemplary embodiments, the taxonomy incrementer is a proof-of-concept piece of code that implements the re-expression algorithm, using the HierValues and HierMember classes in the hypercube library.

The taxonomy incrementer reads a file in which simple Taxonomies and Term Evolution Data can be defined, along with re-expression test cases. This allows quick and easy interactive scenario testing as follows, but the disclosure is not limited thereto:

tax T1 {A,B, D, F, I,J,L{M,N, P}}
tax T2 {A, C,E,G,H, K, L{M, O,Q}}
ted T12*a* T1 T2
ted T12*b* T1 T2 {D→E, F→G,F→H, I→K,J→K, P→Q}
rex T1:A T12*a* T2:A
rex T1:A T12*b* T2:A
rex T1:{{A,B,D, F, I,J,L}T12*a* deleted or replaced}
rex T1: {{A,B,D, F, I,J,L}T12*b* E,G,H, K, L}.

In the above example, there are two Taxonomies, skeletal Tenn Evolution Data, and full Term Evolution Data. The following is the effect of using both of these to re-express simple and complex values. In the first example, it is not known if D is deleted, or replaced by C, E, C, H, K, O or Q, so re-expression fails. In the second example, it is known that D is replaced by E.

Referring back to FIGS. 4, 5A, and 5B, according to exemplary embodiments, the accessing module 414 may be configured to access the database 412 that stores a historic version of taxonomy data (e.g., V1) and a new version of taxonomy data (V2). The analyzing module 416 may be configured to analyze the historic version of taxonomy data V1 and the new version of taxonomy data V2. The determining module 418 may be configured to determine what changes have been made in connection with a particular reference data based on analyzing the historic version of taxonomy data V1 and the new version of taxonomy data V2. The creating module 420 may be configured to create, based on determining, an association between the historic version of taxonomy data V1 and the new version of taxonomy data V2 corresponding to said particular reference data. The generating module 422 may be configured to generate consistent metadata from said association and automatically generate a data structure that illustrates history of evolution of taxonomy in connection with said particular reference data based on the metadata, thereby allowing downstream consumers (i.e. by utilizing client devices 408(1)-408(n)) to understand and interpret the more complex scenario about what actually happened to the taxonomies during evolution, but the disclosure is not limited thereto. The data structure may be displayed on the GUI 426.

According to exemplary embodiments, the designating module 428 may be configured to designate corresponding reference identifier (ID) for each term in the historic version of taxonomy data V1 and the new version of taxonomy data V2 and the comparing module 430 pray be configured to compare the reference ID for each term in the historic version of taxonomy data V1 and the new version of taxonomy data V2 to determine what changes have been made in connection with the particular reference data.

According to exemplary embodiments, the metadata may be a term evolution data construct that describes one or more of the following or a combination thereof: an unchanged term, a term superseded by another term, a term superseded by multiple terms, multiple terms superseded by a term, a term that is superseded by nothing, and term that supersedes nothing.

According to exemplary embodiments, supersede relations are relationships between terms in the historic version of taxonomy data and the crew version of taxonomy data of the same taxonomy.

According to exemplary embodiments, the determining module 418 may be configured to determine that a supersede relationships exists between a first term (T1) in the historic version of taxonomy data V1 and a second term (T2) in the new version of taxonomy data V2 when it is determined that the reference ID of T1 is the same as the reference ID of T2 and that there are no supersedes relationships documented from T2 to anything in V1 or from anything in V2 to T1.

According to exemplary embodiments, the data structure may be an N-dimensional hypercube, and the implementing module 432 may be configured to implement the terms in versioned taxonomies to describe each coverage of a dimension of the N-dimensional hypercube; and implement a data type that supports representing the coverages and supports applying intersection, union, and difference operations on them to generate hierarchical values in the N-dimensional hypercube.

Figure 6:
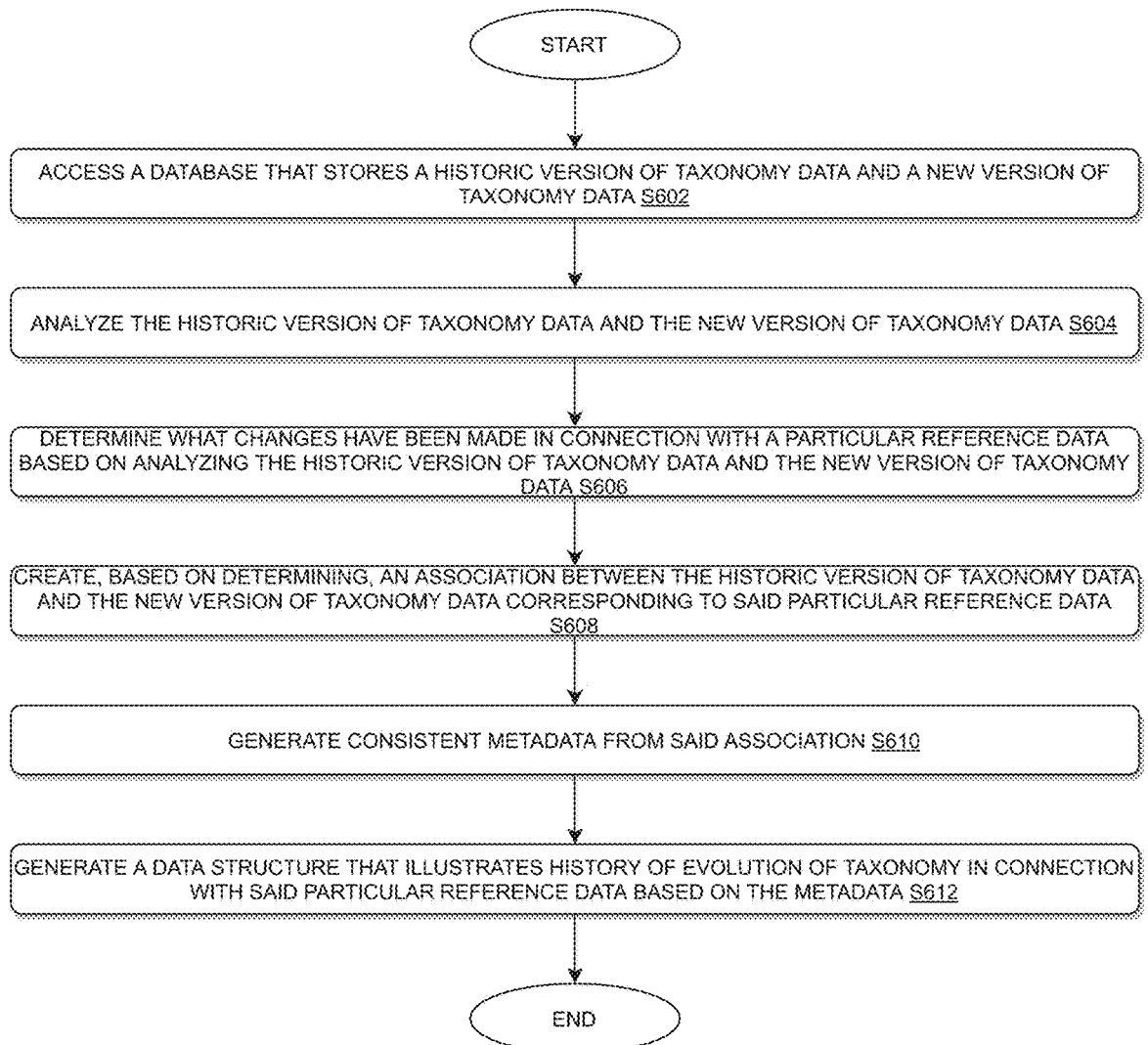
FIG. 6 illustrates a flow chart for automatically generating data structure describing how taxonomies evolve and applying algorithm to evergreen uses of terms from those taxonomies in accordance with an exemplary embodiment.

FIG. 6 illustrates a flow chart for generating data structure describing how taxonomies evolve and applying algorithm to evergreen uses of terms from those taxonomies in accordance with an exemplary embodiment.

In the process 600 of FIG. 6, at step S602, a database may be accessed that stores a historic version of taxonomy data and a new version of taxonomy data. At step S604, the historic version of taxonomy data and the new version of taxonomy data may be analyzed. At step S606, it may be determined what changes have been made in connection with a particular reference data based on analyzing the historic version of taxonomy data and the new version of taxonomy data. At step S608, an association between the historic version of taxonomy data and the new version of taxonomy data may be created corresponding to said particular reference data. At step S610, consistent metadata may be generated from the created association. At step S612, a data structure may be generated that illustrates history of evolution of taxonomy in connection with said particular reference data based on the metadata, thereby allowing downstream consumers (i.e., by utilizing client devices) to understand and interpret the more complex scenario about what actually happened to the taxonomies during evolution, but the disclosure is not limited thereto.

According to exemplary embodiments, the process 600 may further include: designating corresponding reference identifier (ID) for each term in the historic version of taxonomy data and the new version of taxonomy data; and comparing the reference ID for each term in the historic version of taxonomy data and the new version of taxonomy data to determine what changes have been made in connection with the particular reference data.

According to exemplary embodiments, the process 600 may further include: determining that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

According to exemplary embodiments, wherein the data structure may be an N-dimensional hypercube, and the process 600 may further include: implementing the terms in versioned taxonomies to describe each coverage of a dimension of the N-dimensional hypercube.

According to exemplary embodiments, the process 600 may further include: implementing a data type that supports representing the coverages and supports applying intersection, union, and difference operations on them to generate hierarchical values in the N-dimensional hypercube.

According to exemplary embodiments, the ADSGD 402 may include a memory (e.g., a memory 106 as illustrated in FIG. 1) which may be a non-transitory computer readable medium that may be configured to store instructions for implementing an ADSGM 406 for automatically generating a data structure as disclosed herein. The ADSGD 402 may also include a medium reader (e.g., a medium n reader 112 as illustrated in FIG. 1) which may be configured to read any one or more sets of instructions, e.g., software, from any of the memories described herein. The instructions, when executed by a processor embedded within the ADSGM 406 or within the ADSGD 402, may be used to perform one or more of the methods and processes as described herein. In a particular embodiment, the instructions may reside completely, or at least partially, within the memory 106, the medium reader 112, and/or the processor 104 (see FIG. 1) during execution by the ADSGD 402.

For example, the instructions, when executed, may cause the processor 104 to perform the following: accessing a database that stores a historic version of taxonomy data and a new version of taxonomy data; analyzing the historic version of taxonomy data and the new version of taxonomy data; determining what changes have been made in connection with a particular reference data based on analyzing the historic version of taxonomy data and the new version of taxonomy data; creating, based on determining, an association between the historic version of taxonomy data and the new version of taxonomy data corresponding to said particular reference data; generating consistent metadata from said association; and generating a data structure that illustrates history of evolution of taxonomy in connection with said particular reference data based on the metadata, thereby allowing downstream consumers (i.e., by utilizing client devices) to understand and interpret the more complex scenario about what actually happened to the taxonomies during evolution, but the disclosure is not limited thereto.

According to exemplary embodiments, the instructions, when executed, may further cause the processor 104 to perform the following: designating corresponding reference identifier (ID) for each term in the historic version of taxonomy data and the new version of taxonomy data; and comparing the reference ID for each term in the historic version of taxonomy data and the new version of taxonomy data to determine what changes have been made in connection with the particular reference data.

According to exemplary embodiments, the instructions, when executed, may further cause the processor 104 to perform the following: determining that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

According to exemplary embodiments, the data structure may be an N-dimensional hypercube, and the instructions, when executed, may further cause the processor 104 to perform the following: implementing the terms in versioned taxonomies to describe each coverage of a dimension of the N-dimensional hypercube; and implementing a data type that supports representing the coverages and supports applying intersection, union, and difference operations on them to generate hierarchical values in the N-dimensional hypercube.

According to exemplary embodiments as disclosed above in FIGS. 1-6, technical improvements effected by the instant disclosure may include platforms for generating a data structure describing how taxonomies evolve and applying algorithm to evergreen uses of terms from those taxonomies, thereby allowing downstream consumers to understand and interpret the more complex scenario about what actually happened to the taxonomies during evolution, but the disclosure is not limited thereto.

Although the invention has been described reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term computer-readable edit shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting exemplary embodiment, the computer-readable tedium can include a solid-state memory such as a memory card or other package that houses one or more non-volatile read-only memories. Further, the computer-readable medium can be a random access memory or other volatile re-writable memory. Additionally; the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of his application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matters to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a data structure by utilizing one or more processors and one or more memories, the method comprising:
   accessing, by a processor, a database that stores a historic version of taxonomy data and a new version of taxonomy data;
   analyzing, by the processor, the historic version of taxonomy data and the new version of taxonomy data;
   determining, by the processor, what changes have been made in connection with a particular reference data based on analyzing the historic version of taxonomy data and the new version of taxonomy data;
   creating, by the processor, based on determining, an association between the historic version of taxonomy data and the new version of taxonomy data corresponding to said particular reference data;
   generating, by the processor, consistent metadata from said association;
   generating, by the processor, a data structure that illustrates history of evolution of taxonomy in connection with said particular reference data based on the metadata, wherein the data structure is a one-dimensional data structure;
   designating, by the processor, corresponding reference identifier (ID) for each term in the historic version of taxonomy data and the new version of taxonomy data;
   implementing, by the processor, terms in versioned taxonomies to describe each coverage of a dimension of an N-dimensional hypercube;
   displaying, by the processor, on a GUI, the data structure and terms that can be selected from the taxonomy data;
   comparing, by the processor, the reference ID for each term in the historic version of taxonomy data and the new version of taxonomy data to determine what changes have been made in connection with the particular reference data;
   determining, by the processor, that a term from the taxonomy data is selected in the GUI; and
   utilizing, by the processor, the new version of the taxonomy data to re-express, in the GUI, hierarchical values of the term from the taxonomy data to form new hierarchical values, regardless of whether the hierarchical values are on their own or whether there are a number of constrained dimensions, each with a corresponding hierarchical value,
   wherein the data structure is the N-dimensional hypercube and the data structure is a model that automatically implements re-expression, hypercube library, and a taxonomy code that implements a re-expression algorithm using hierarchical values and hierarchical member classes in the hypercube library.

2. The method according to claim 1, wherein the metadata is a term evolution data construct that describes one or more of the following or a combination thereof: an unchanged term, a term superseded by another term, a term superseded by multiple terms, multiple terms superseded by a term, a term that is superseded by nothing, and term that supersedes nothing.

3. The method according to claim 2, wherein supersede relations are relationships between terms in the historic version of taxonomy data and the new version of taxonomy data of the same taxonomy.

4. The method according to claim 2, further comprising:
   determining, by the processor, that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

5. The method according to claim 1, wherein the model automatically implements, by the processor, the re-expression by re-expressing all the terms in all term sets in all scope qualifying expressions in all data boundary sets for a given data fact, wherein the model only utilizes the terms from a prescribed set of vocabulary versions.

6. The method according to claim 5, wherein the re-expression requires at least one from among: source vocabulary versions; target vocabulary versions, term evolution data mapping between source and target terms; and source fact.

7. A system for generating a data structure, the system comprising:
   a database that stores a historic version of taxonomy data and a new version of taxonomy data; and
   a processor coupled to the database via a communication network, wherein the processor is configured to:

analyze, by the processor, the historic version of taxonomy data and the new version of taxonomy data by accessing the database;

determine, by the processor, what changes have been made in connection with a particular reference data based on analyzing the historic version of taxonomy data and the new version of taxonomy data;

create, by the processor, based on determining, an association between the historic version of taxonomy data and the new version of taxonomy data corresponding to said particular reference data;

generate, by the processor, consistent metadata from said association;

generate, by the processor, a data structure that illustrates history of evolution of taxonomy in connection with said particular reference data based on the metadata, wherein the data structure is a one-dimensional data structure;

designate, by the processor, corresponding reference identifier (ID) for each term in the historic version of taxonomy data and the new version of taxonomy data;

implement, by the processor, terms in versioned taxonomies to describe each coverage of a dimension of an N-dimensional hypercube;

display, by the processor, on a GUI, the data structure and terms that can be selected from the taxonomy data;

compare, by the processor, the reference ID for each term in the historic version of taxonomy data and the new version of taxonomy data to determine what changes have been made in connection with the particular reference data;

determine, by the processor, that a term from the taxonomy data is selected in the GUI; and utilize, by the processor, the new version of the taxonomy data to re-express, in the GUI, hierarchical values of the term from the taxonomy data to form new hierarchical values, regardless of whether the hierarchical values are on their own or whether there are a number of constrained dimensions, each with a corresponding hierarchical value, wherein the data structure is the N-dimensional hypercube and the data structure is a model that automatically implements re-expression, hypercube library, and a taxonomy code that implements a re-expression algorithm using hierarchical values and hierarchical member classes in the hypercube library.

8. The system according to claim 7, wherein the metadata is a term evolution data construct that describes one or more of the following or a combination thereof: an unchanged term, a term superseded by another term, a term superseded by multiple terms, multiple terms superseded by a term, a term that is superseded by nothing, and term that supersedes nothing.

9. The system according to claim 8, wherein supersede relations are relationships between terms in the historic version of taxonomy data and the new version of taxonomy data of the same taxonomy.

10. The system according to claim 8, wherein the processor is further configured to:

determine, by the processor, that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

11. The system according to claim 7, wherein the model automatically implements, by the processor, the re-expression by re-expressing all the terms in all term sets in all scope qualifying expressions in all data boundary sets for a given data fact, wherein the model only utilizes the terms from a prescribed set of vocabulary versions.

12. The system according to claim 11, wherein the re-expression requires at least one from among: source vocabulary versions; target vocabulary versions, term evolution data mapping between source and target terms; and source fact.

13. A non-transitory computer readable medium configured to store instructions for generating a data structure, wherein, when executed, the instructions cause a processor to perform the following:

accessing, by the processor, a database that stores a historic version of taxonomy data and a new version of taxonomy data;

analyzing, by the processor, the historic version of taxonomy data and the new version of taxonomy data;

determining, by the processor, what changes have been made in connection with a particular reference data based on analyzing the historic version of taxonomy data and the new version of taxonomy data;

creating, by the processor, based on determining, an association between the historic version of taxonomy data and the new version of taxonomy data corresponding to said particular reference data;

generating, by the processor, consistent metadata from said association;

generating, by the processor, a data structure that illustrates history of evolution of taxonomy in connection with said particular reference data based on the metadata, wherein the data structure is an N-dimensional hypercube or a one-dimensional data structure;

designating, by the processor, corresponding reference identifier (ID) for each term in the historic version of taxonomy data and the new version of taxonomy data;

implementing, by the processor, terms in versioned taxonomies to describe each coverage of a dimension of an N-dimensional hypercube;

comparing, by the processor, the reference ID for each term in the historic version of taxonomy data and the new version of taxonomy data to determine what changes have been made in connection with the particular reference data;

determining, by the processor, that a term from the taxonomy data is selected in the GUI; and utilizing, by the processor, the new version of the taxonomy data to re-express, in the GUI, hierarchical values of the term from the taxonomy data to form new hierarchical values, regardless of whether the hierarchical values are on their own or whether there are a number of constrained dimensions, each with a corresponding hierarchical value, wherein the data structure is the N-dimensional hypercube and the data structure is a model that automatically implements re-expression, hypercube library, and a taxonomy code that implements a re-expression algorithm using hierarchical values and hierarchical member classes in the hypercube library.

14. The non-transitory computer readable medium according to claim 13, wherein the metadata is a term evolution data construct that describes one or more of the following or a combination thereof: an unchanged term, a term superseded by another term, a term superseded by multiple terms, multiple terms superseded by a term, a term that is superseded by nothing, and term that supersedes nothing.

15. The non-transitory computer readable medium according to claim 14, wherein supersede relations are relationships between terms in the historic version of taxonomy data and the new version of taxonomy data of the same taxonomy.

16. The non-transitory computer readable medium according to claim 14, wherein the instructions, when executed, further cause the processor to perform the following:

determining, by the processor, that a supersede relationships exists between a first term (T1) in the historic version of taxonomy data (V1) and a second term (T2) in the new version of taxonomy data (V2) when it is determined that the reference ID of T1 is the same as the reference ID of T2 and that there are no supersedes relationships documented from T2 to anything in V1 or from anything in V2 to T1.

17. The non-transitory computer readable medium according to claim 13, wherein the model automatically implements, by the processor, the re-expression by re-expressing all the terms in all term sets in all scope qualifying expressions in all data boundary sets for a given data fact, wherein the model only utilizes the terms from a prescribed set of vocabulary versions.

18. The non-transitory computer readable medium according to claim 17, wherein the re-expression requires at least one from among: source vocabulary versions; target vocabulary versions, term evolution data mapping between source and target terms; and source fact.

* * * * *